United States Patent [19]

Maucher

[11] Patent Number: 4,572,341

[45] Date of Patent: Feb. 25, 1986

[54] SELF-ADJUSTING RELEASE SYSTEM FOR FRICTION CLUTCHES

[75] Inventor: Paul Maucher, Sasbach, Fed. Rep. of Germany

[73] Assignee: LUK Lamellen und Kupplungsbau GmbH, Bühl, Fed. Rep. of Germany

[21] Appl. No.: 592,240

[22] Filed: Mar. 22, 1984

[30] Foreign Application Priority Data

Apr. 14, 1983 [DE] Fed. Rep. of Germany ....... 3313551

[51] Int. Cl.$^4$ .................... F16D 13/75; F16D 67/02
[52] U.S. Cl. ............................. 192/13 R; 192/18 R; 192/111 A
[58] Field of Search ............... 192/18 R, 70.25, 70.26, 192/70.3, 89 B, 98, 99 A, 99 S, 101, 109 B, 109 A, 109 R, 111 R, 111 A, 13 R; 188/71.7, 71.8

[56] References Cited

U.S. PATENT DOCUMENTS

| | | | |
|---|---|---|---|
| 2,036,004 | 3/1936 | Wemp | 192/111 A X |
| 2,616,540 | 11/1952 | Miller | 192/111 A X |
| 3,202,247 | 8/1965 | Schmidt et al. | 192/111 A X |
| 4,109,773 | 8/1978 | Higgerson et al. | 192/111 A |
| 4,445,600 | 5/1984 | Schmidt | 192/111 A |

*Primary Examiner*—George H. Krizmanich
*Attorney, Agent, or Firm*—Peter K. Kontler

[57] ABSTRACT

A self-adjusting release system for the friction clutch of a motor vehicle wherein the output element of the clutch is or transmits torque to the input element of a change-speed transmission. The input member of the release system is a first lever which is pivotable by the clutch pedal and is automatically coupled to a second lever when it leaves its starting position in response to depression of the pedal whereby the second lever disengages the clutch. The first lever automatically engages a brake for the input element of the change-speed transmission as soon as the clutch is disengaged. A set of springs is provided to automatically return the levers to their starting positions when the pressure upon the clutch pedal is relaxed and to uncouple the second lever from the first lever in order to enable the second lever to change its angular position relative to the first lever for the purpose of compensating for wear upon component parts of the clutch, brake and/or release system.

20 Claims, 2 Drawing Figures

SELF-ADJUSTING RELEASE SYSTEM FOR FRICTION CLUTCHES

BACKGROUND OF THE INVENTION

The present invention relates to so-called release systems (declutching devices) for friction clutches, and more particularly to improvements in self-adjusting release systems for the friction clutches of motor vehicles or the like. Still more particularly, the invention relates to preferably self-adjusting release systems for friction clutches of the type wherein an antifriction bearing or analogous clutch-actuating component is movable into deforming or displacing engagement with a clutch portion (such as the prongs of a diaphragm spring) which thereupon causes disengagement of the clutch, i.e., cessation of transmission of torque from a rotary input element (such as the flywheel or crankshaft of an internal combustion engine) to a rotary output element (such as the input shaft of a change-speed transmission in a motor vehicle).

It is already known to provide in a clutch release system a pair of levers which are pivotably mounted in the bell-shaped housing of the friction clutch. One of the levers is used to pivot the other lever and the other lever can be pivoted to a position in which it urges the bearing against the diaphragm spring to thereby disengage the clutch. When not pivoted, the one lever is caused to abut against a stop while the clutch is engaged, i.e., while the other lever ceases to urge the bearing against the diaphragm spring. The angular positions of the two levers relative to one another are adjustable in order to compensate for wear upon the friction linings of the clutch. The one lever is pivotable by the clutch pedal and the two levers are connected to each other by a coupling device which is effective only when the one lever is pivoted by the pedal in a (first) direction in order to pivot the other lever toward engagement with the bearing and to thereby shift the bearing into engagement with the diaphragm spring of the clutch.

Release systems of the above outlined character are often employed in motor vehicles in order to compensate for wear upon the friction linings and/or pressure plates of the clutch which serves to transmit torque from the output element of the engine to the input element of the change-speed transmission. The self-adjusting feature of the release system is desirable and advantageous because it ensures that the extent of depression of the clutch pedal preparatory to shifting into a different gear will remain at least substantially unchanged in spite of the aforementioned wear upon one or more parts of the friction clutch. The wear can be especially pronounced upon the prongs of the diaphragm spring, upon the friction linings of the clutch disc, upon the pressure plates which flank the clutch disc, upon the linkage which transmits motion from the clutch pedal to the one lever of the release system, upon the coupling between the two levers and/or upon any other part or parts which, as a result of extensive wear, could induce a change in the extent of depression of the clutch pedal for the purpose of disengaging the clutch. As mentioned above, one presently popular automatic self-adjusting feature includes the provision of means for allowing or causing automatic changes in the mutual angular positions of the two levers in response to progressing wear upon one or more of the aforeenumerated parts. As a rule, the lever which can engage the bearing is mounted for angular movement relative to the lever which is pivoted by the clutch pedal, and such automatic angular adjustment takes place when the clutch is engaged, i.e., when the operator of the vehicle does not maintain the clutch pedal in depressed position. This ensures that, when the clutch pedal is depressed, the extent of its movement to depressed position is not affected by the wear upon one or more parts of the clutch and/or of the release system because the lever which acts upon the bearing has changed its position relative to the lever which is operatively connected with the clutch pedal.

Many motor vehicles, especially heavy-duty motor vehicles which are used for hauling of heavy loads and/or vehicles which are used at construction sites, must be equipped with brakes for the input elements of their change-speed transmissions. Such brakes are or must be provided in addition to the aforediscussed self-adjusting release systems. Immediate braking of the input shaft of the changespeed transmission in response to disengagement of the clutch (i.e., in response to cessation of torque transmission from the engine to the transmission) is desirable and advantageous because it ensures more rapid, more predictable and more reliable shifting into a different gear. In accordance with a presently known proposal, the brake is actuated by the antifriction bearing which is movable by the other lever of the release system in order to deform or displace the diaphragm spring of the friction clutch. The brake then decelerates or arrests the input shaft of the change-speed transmission not earlier than on disengagement of the clutch. A presently used device for actuating the brake comprises two coaxial sleeves and an axially acting adjusting device (such as a freewheel employing clamping elements) or an angularly acting adjusting device therebetween. One of the sleeves serves to act upon a mobile clutch component (such as upon the radial prongs of the diaphragm spring) and the other sleeve receives motion from the clutch pedal to displace the one sleeve as well as to actuate the brake for the input shaft of the change-speed transmission. In such release systems, the adjusting means between the two sleeves compensates for wear to thereby ensure that the extent of depression of the clutch pedal remains unchanged as well as to ensure that the brake for the input shaft of the transmission is actuated irrespective of eventual wear upon the parts which are disposed between the other sleeve and the pedal.

The just discussed brake actuating system exhibits a number of serious drawbacks. Thus, it is very complex, sensitive, prone to malfunction and expensive. Moreover, it takes up a substantial amount of space which is always at a premium under the hood of a motor vehicle. Still further, it comprises a large number of discrete parts which contributes to initial cost, to the cost of assembly as well as to maintenance cost.

OBJECTS AND SUMMARY OF THE INVENTION

An object of the invention is to provide a novel and improved release system for friction clutches which is constructed and assembled in such a way that it ensures predictable disengagement of the clutch as well as predictable engagement of the brake for the input element of the change-speed transmission in a motor vehicle irrespective of the extent of wear upon the clutch, the brake and/or the release system.

Another object of the invention is to provide a release system which is simpler, more compact, less expensive and more reliable than heretofore known release systems.

A further object of the invention is to provide a release system which can be used in conjunction with presently known friction clutches for motor vehicles or the like.

An additional object of the invention is to provide a novel and improved brake which can be actuated by the above outlined release system for friction clutches of motor vehicles or the like.

Still another object of the invention is to provide a novel and improved system for transmitting motion from the clutch pedal to the diaphragm spring of the friction clutch in a motor vehicle.

Another object of the invention is to provide a novel and improved method of engaging and disengaging the friction clutch as well as for engaging and disengaging the brake for the input element of the change-speed transmission in a motor vehicle in proper sequence and regardless of the extent of wear upon the clutch, the brake and/or the release system.

A further object of the invention is to provide the release system with novel and improved means to compensate for wear upon the parts of the clutch, the brake and the release system.

An additional object of the invention is to provide a motor vehicle which embodies the above outlined release system.

A feature of the invention resides in the provision of a release system, particularly a self-adjusting release system for friction clutches of the type having a rotary output element, a brake which is actuatable to decelerate the output element (this is intended to embrace deceleration to zero speed) and a component which is movable to and from a clutch-actuating position. The release system comprises input and output members which are pivotable in first and second directions, means for pivoting one of the members in the first direction, means for releasably coupling the two members for joint movement in the first direction, means provided on the other member for advancing the clutch-actuating component to the clutch-actuating position in response to pivoting of the one member in the first direction, means on the one member for actuating the brake upon actuation of the clutch by the clutch-actuating component through the medium of the other member, and means for moving the two members in the second direction back to starting positions. The release system preferably further comprises stop means for limiting the extent of movement of the one member in the second direction under the action of the moving means. Such stop means is preferably located in the path of movement of the coupling means with the two members in the second direction under the action of the moving means and is arranged to separate the coupling means from one of the two members, e.g., from the output member. The release system further comprises shaft means which is mounted in the housing for the clutch and defines a pivot axis for each of the two members, e.g., a common pivot axis for these members. In other words, the shaft means can comprise a common shaft for the input and output members of the release system. The clutch actuating component is or can constitute an antifriction bearing, and the means for pivoting the two members in the first direction can comprise or constitute a clutch pedal. The output element of the clutch is the input element (e.g., an elongated shaft) of the change-speed transmission in a motor vehicle which employs the friction clutch. It is presently preferred to construct the release system in such a way that the one member is the input member, i.e., that the clutch pedal can pivot the input member in the first direction whereby the input member pivots the output member through the medium of the coupling means. Means (e.g., a pivot pin) is provided for securing the coupling means to the input member. The coupling means can comprise a pawl which is angularly movably supported on the input member. Such pawl can comprise a first profiled (e.g., toothed or otherwise serrated) portion and the output member then comprises a second profiled portion which is complementary to the first profiled portion and is engaged by the latter in response to movement of the input member in the first direction whereby the profiled portions lock the two members to each other and compel the output member to share the movement of the input member in the first direction.

Resilient means is provided for yieldably biasing the first profiled portion against the second profiled portion; such resilient means can comprise a torsion spring which reacts against the input member and bears against the pawl to turn the latter about the axis of the pivot pin in a direction toward the profiled portion of the output member. Resilient means (e.g., a second torsion spring) can be interposed between the two members to tend to pivot such members in opposite directions, preferably in such a way that the output member tends to move toward engagement with the clutch-actuating means.

The moving means can comprise the diaphragm spring of the clutch and/or a discrete spring (e.g., a coil spring) for yieldably biasing the input member in the second direction, namely toward the stop means. The force with which the moving means can bias the input member in the second direction exceeds the force with which the spring for the coupling means urges the latter toward engagement with the output member so that the coupling means is automatically disengaged from the output member not later than when the input member reassumes its starting position under the action of the moving means. This is desirable if the automatic self-adjusting feature of the release system involves angular displacement of the output member relative to the input member while the coupling means is ineffective, i.e., while the clutch is engaged but the brake for the output element of the clutch (input element of the change-speed transmission) is idle. The arrangement is preferably such that the moving means overcomes the bias of the spring which tends to pivot the coupling means relative to the input member not later than during the last stage of movement of the input member in the second direction, i.e., toward the starting position.

The means for pivoting the two members in the first direction can be said to comprise the shaft means, the housing for such shaft means and the aforementioned clutch pedal. If the input member is rigidly connected with the shaft means, the clutch pedal is arranged to pivot the input member in the first direction through the medium of the shaft means. The axis of such shaft means is or can be normal to the axis of the output element.

The brake can comprise a disc which is axially movably mounted on and is rotatable with the output element, a stationary pressure plate which is preferably provided on the aforementioned housing and is disposed at one side of the disc, and a movable pressure plate which is disposed at the other side of the disc and is movable axially toward the disc by the input member of the release system to thereby move the disc into frictional engagement with the stationary pressure plate. The brake preferably further comprises means for yieldably biasing the movable pressure plate away from the stationary pressure plate and away from the disc to thus ensure that the brake is disengaged as soon as the input member of the release system begins to pivot in the second direction.

The novel features which are considered as characteristic of the invention are set forth in particular in the appended claims. The improved release system itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
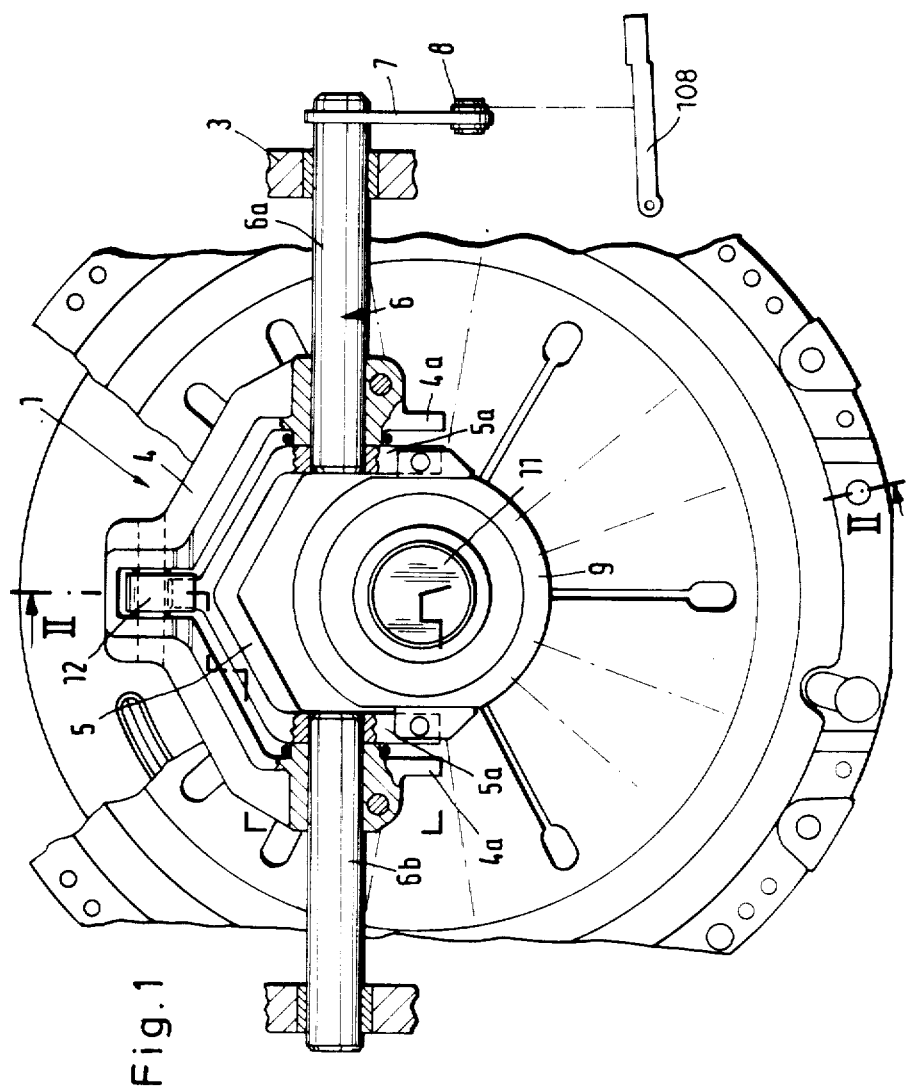
FIG. 1 is a fragmentary partly sectional end elevational view of a release system which embodies the invention.
Figure 2:
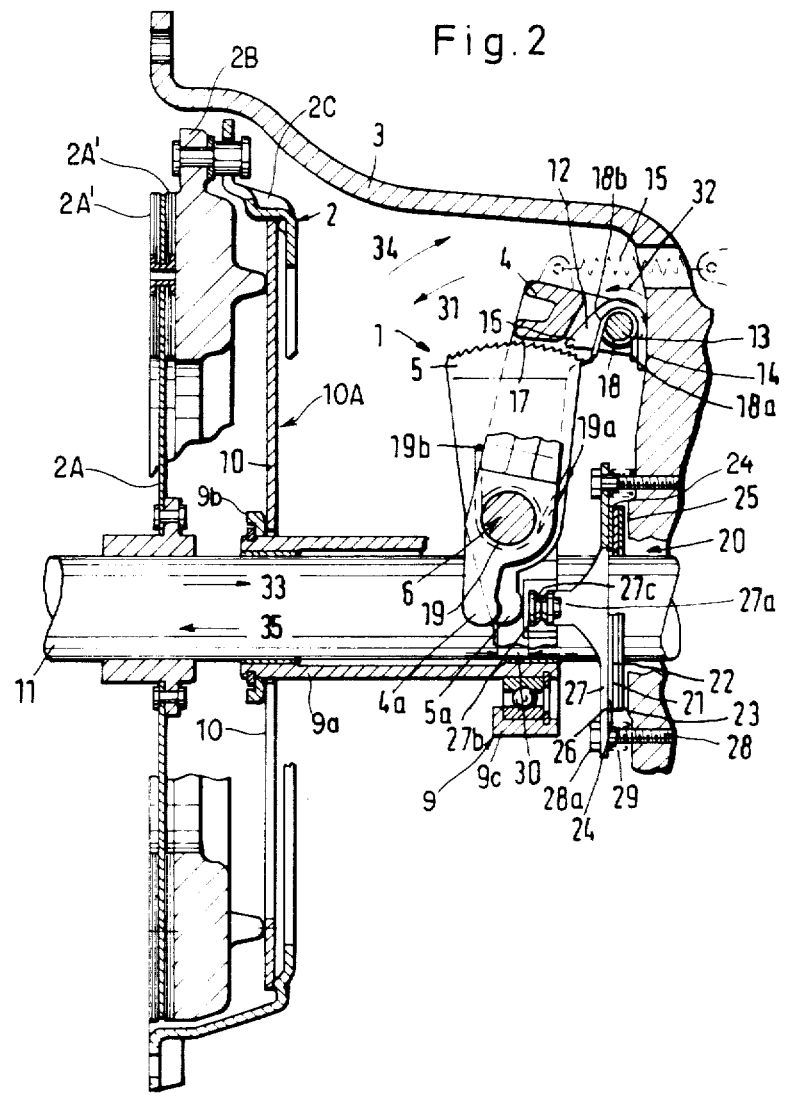
FIG. 2 is a sectional view as seen in the direction of arrows from the line II—II of FIG. 1, further showing a portion of a friction clutch and a presently preferred embodiment of the brake for the output element of the clutch.

The self-adjusting release system 1 which is shown in FIGS. 1 and 2 is used to selectively disengage a friction clutch 2 which is assumed to be installed in a motor vehicle and serves to transmit torque from the crankshaft of the engine to the input element 11 of a change-speed transmission whose output element transmits torque to the wheels. The release system 1 is installed in the interior of a bell-shaped housing 3 only a portion of which is shown in each of FIGS. 1 and 2. The right-hand portion of the housing 3, as viewed in FIG. 2, is integral with or connected to the case of the change-speed transmission which includes the input element 11. The latter is an elongated rotary shaft which can receive torque from the clutch disc 2A of the clutch 2 when such clutch disc receives torque from the crankshaft of the engine by way of two pressure plates including the pressure plate 2B. The pressure plate 2B is coupled to the cover 2C of the clutch 2 and can frictionally engage one of the two linings 2A' on the clutch disc 2. The exact construction of the clutch 2 forms no part of the present invention.

The release system 1 comprises an input member 4 which is a lever pivotable about the axis of a composite shaft 6, and an output member 5 which is a lever also pivotable about the axis of the shaft 6. The latter is mounted in the housing 3 and its axis is normal to the axis of the input element 11 of the change-speed transmission. The means for pivoting the input member 4 in a counterclockwise direction (see the arrow 31), as viewed in FIG. 2, comprises a clutch pedal 108 which can pivot the input member 4 through the medium of the shaft 6, a linkage 8 which receives motion from the pedal 108, and a link 7 which is rigidly connected to the shaft 6, the same as the input member 4. In the illustrated embodiment, the shaft 6 comprises two coaxial sections 6a, 6b; the input member 4 is rigidly connected to the section 6a and the output member 5 is pivotable about the axis of the section 6b. The sections 6a and 6b are rotatably journalled in the housing 3. One reason for the utilization of a composite shaft 6 is that the clutch-actuating component 9 of the release system 1 is an antifriction bearing which is axially movably mounted on the input element 11 of the change-speed transmission and occupies space between the shaft sections 6a, 6b. A sleeve-like part 9a which is rigid with the inner race of the bearing 9 directly surrounds the input element 11 and its flange 9b engages and entrains the prongs 10 of a diaphragm spring 10A, which latter forms part of the friction clutch 2, when the output member 5 of the release system 1 causes the part 9a to move axially of the input element 11 in the direction which is indicated by the arrow 33 shown in FIG. 2.

The release system 1 further comprises a coupling device in the form of a pawl 12 which can turn about the axis of a pivot member 13 on the input member 4 and serves to establish, during certain stages of operation of the system 1, a motion transmitting connection between the input member 4 and the output member 5. The arrangement is such that the members 4 and 5 are coupled to each other by way of the pawl 12 when the input member 4 is pivoted in the direction of arrow 31 for the purpose of disengaging the normally engaged clutch 2 by causing the diaphragm spring 10A to cease the application of bias to the pressure plate 2B in a direction to frictionally engage the adjacent lining 2A' of the clutch disc 2A.

When the clutch 2 is engaged, i.e., when the release system 1 is idle, the members 4, 5 of the release system assume the starting positions which are shown in FIG. 2. The pawl 12 is then disengaged from the output member 5 and abuts against a fixed stop 14 which can constitute an integral wall or a separable part of the housing 3. The axis of the pivot member 13 for the pawl 12 is parallel to the axis of the shaft 6. A coil spring 15 is provided to constitute an energy storing means for yieldably biasing the input member 4 to the starting position of FIG. 2 and for simultaneously urging the pawl 12 against the stop 14. The spring 15 is shown only schematically (by phantom lines) because it constitutes but one form of biasing means which can be utilized to yieldably hold the input member 4 and the pawl 12 in the starting positions of FIG. 2 when the clutch pedal 108 is not depressed.

The pawl 12 comprises a first profiled portion 16 in the form of serrations or teeth which is complementary to a second profiled portion 17 provided on the output member 5. When the profiled portion 16 is caused or permitted to engage the complementary profiled portion 17, the members 4, 5 are properly coupled to each other and the member 5 is then compelled to share the angular movements of the member 4 about the axis of the shaft 6.

In order to enhance the reliability of the motion transmitting connection between the members 4 and 5 during certain stages of operation of the release system 1, the latter further comprises means for yieldably biasing the pawl 12 into engagement with the output member 5, i.e., for yieldably biasing the first profiled portion 16 toward engagement with the second profiled portion 17. Such biasing means comprises a torsion spring 18 whose central portion surrounds the pivot member 13, one leg (18a) of which bears against the pawl 12 and the other leg (18b) of which reacts against the input member 4. The torsion spring 18 tends to turn the pawl 12 in a counterclockwise direction (see the arrow 32 in FIG.

2), i.e., it tends to urge the profiled portion 16 toward the profiled portion 17.

The force with which the coil spring 15 urges the input member 4 toward the starting position of FIG. 2 is greater than the force of the torsion spring 18; this ensures that the profiled portion 16 is disengaged from the profiled portion 17 in automatic response to movement of the pawl 12 against the stop 14 while the input member 4 is in the process of completing its movement toward the position of FIG. 2. In other words, the input member 4 causes the torsion spring 18 to store energy during the last stage of its movement under the action of the coil spring 15, i.e., when the clutch pedal 108 is released and permits the shaft section 6a to turn in a clockwise direction as indicated by the arrow 34 of FIG. 2. Such disengagement of the profiled portion 16 from the profiled portion 17 takes place when the clutch 2 is reengaged as a result of movement of the sleeve-like part 9a of the clutch-actuating bearing 9 in the direction of the arrow 35 shown in FIG. 2, i.e., when the flange 9b of the part 9a allows the prongs 10 of the diaphragm spring 10A to reassume the positions which are shown in FIG. 2 so that the diaphragm spring 10A is free to urge the clutch plate 2B against the respective lining 2A' on the clutch disc 2A.

The release system 1 further comprises an additional energy storing means in the form of a second torsion spring 19 which acts between the members 4 and 5 and serves to compensate for wear upon certain parts, i.e., to furnish the self-adjusting action which is desirable in order to ensure that the extent of depression of the clutch pedal 108 for the purpose of disengaging the clutch 2 remains at least substantially constant. The central portion of the torsion spring 19 is convoluted on the shaft 6; its leg 19a engages the output member 5; and its leg 19b engages the input member 4. This spring tends to pivot the members 4 and 5 in opposite directions. In addition, the leg 19a of the torsion spring 19 tends to urge the output member 5 toward, engagement with the clutch-actuating bearing 9. It will be noted that the spring 19 assists the coil spring 15 in overcoming the bias of the torsion spring 18 for the coupling pawl 12.

FIG. 1 shows that each of the members 4 and 5 constitutes a substantially C-shaped lever. The output member 5 has two projections or lobes 5a which can engage the adjacent portion of the non-rotating outer race 9c of the bearing 9. The member 5 is located within the confines of the C-shaped input member 4 which latter comprises two projections or lobes 4a serving to actuate or engage a brake 20 when the clutch 2 is disengaged and to thereby decelerate or arrest the normally rotating input element 11 of the change-speed transmission. This facilitates the shifting into a different gear in that the input element 11 ceases to rotate or is decelerated in automatic response to disengagement of the friction clutch 2.

The illustrated brake 20 comprises a disc-shaped member 21 which is non-rotatably but axially movably mounted on the input element 11 and comprises a carrier 22 directly mounted on the element 11 and supporting two brake shoes 23, 24. The brake 20 further comprises a stationary first pressure plate 25 which is an integral or separable part of the bell-shaped housing 3 and is adjacent to the shoe 23, and an axially movable pressure plate 27 having a surface 26 facing the other shoe 24 on the carrier 22 of the disc-shaped member 21. The pressure plate 27 is a washer-like part which surrounds the input element 11 of the change-speed transmission. This pressure plate is non-rotatably but axially movably secured to the housing 3 by a set of screws 28 so that it can move toward the shoe 24 under the action of lobes 4a on the input member 4 or away from the shoe 24 under the action of coil springs 29 surrounding the shanks of the screws 28 and urging the pressure plate 27 in a direction away from the pressure plate 25. The brake 20 is activated when the lobes 4a of the input member 4 press the surface 26 of the pressure plate 27 against the shoe 24 to thereby move the shoe 23 against the pressure plate 25. Since the member 21 cannot rotate on the input element 11 and the pressure plates 25, 27 are non-rotatably provided and mounted on the housing 3, the input element 11 is brought to an immediate halt or is adequately decelerated not earlier than when the lobes 5a of the output member 5 cause the bearing 9 to disengage the friction clutch 2. The brake 20 further comprises means for automatically disengaging the pressure plates 25 and 27 from the respective shoes 23, 24 when the lobes 4a of the input member 4 are moved in a direction to the left, as viewed in FIG. 2, i.e., when the output member 5 permits the diaphragm spring 10A to reengage the clutch 2. Such disengaging means are the aforementioned coil springs 29 which surround the shanks of the respective screws 28 and automatically urge the pressure plate 27 in a direction away from the pressure plate 25 on the housing 3. The extent of movement of the pressure plate 27 axially of the input element 11 and away from the pressure plate 25 is determined by the selected positions of the heads 28a of the screws 28, i.e., by the distance between such heads and the pressure plate 25. The axial positions of the screws 28 can be changed to thus determine the extent of axial movability of the pressure plate 27 with reference to the pressure plate 25. Alternatively, the illustrated screws 28 can be replaced with shorter or longer screws to accomplish the same result.

In the illustrated embodiment of the brake 20, the pressure plate 27 comprises two portions 27a which extend in parallelism with the input element 11 and in a direction away from the pressure plate 25. The portions 27a are disposed diametrically or substantially diametrically opposite one another (with reference to the axis of the input element 11) and extend into the path of movement of the respective lobes 4a of the input member 4. The lobes 4a actually engage axially movable bolts 27b which are mounted on the respective portions 27a of the pressure plate 27 and are biased by dished springs 27c reacting against the respective portions 27a and urging the heads of the bolts 27b toward the aligned lobes 4a, i.e., in a direction to the left, as viewed in FIG. 1.

When the input member 4 is held in the starting position of FIG. 2, i.e., when the clutch 2 is engaged and the brake 20 should be disengaged, the tips of the lobes 4a are separated from the heads of the respective bolts 27b by clearances 30 one of which is shown in FIG. 2. The provision of such clearances ensures that the brake 20 cannot be engaged (by the input member 4) before the output member 5 disengages the clutch 2 via bearing 9. In other words, the pressure plates 25 and 27 should not engage the respective linings 23, 24 on the disc-shaped member 21 of the brake 20 before the diaphragm spring 10A permits the pressure plate 2B of the friction clutch 2 to become disengaged from the respective friction lining 2A' of the clutch disc 2A.

The purpose of the dished springs 27c is to compensate for manufacturing tolerances as well as for tolerances due to assembly and/or wear upon the parts of the clutch 2, release system 1 and brake 20. It is clear that such dished springs can be replaced with different biasing means. The same holds true for other biasing means which are used in the release system 1, clutch 2 and brake 20.

The operation of the improved release system 1 and brake 20 is as follows:

As mentioned above, the members 4 and 5 of the release system 1 are caused to assume the starting positions of FIG. 2 when the clutch pedal 108 is not depressed so that the input member 4 can follow the bias of the spring 15 and the output member 5 can follow the bias of the spring 19. When the operator of the motor vehicle in which the friction clutch 2 is installed desires to disengage the clutch for the purpose of shifting into a different gear, the clutch pedal 108 is depressed to pivot the input member 4 (via linkage 8, member 7 and shaft 6) in the direction of arrow 31. At least the section 6a of the shaft 6 shares such angular movement of the input member 4. The input member 4 entrains the pawl 12 which becomes gradually disengaged from the stop 14 of the housing 3 and is free to turn about the axis of the pivot member 13 under the action of the torsion spring 18 (the pawl 12 is then caused to turn in the direction of arrow 32, i.e., counterclockwise, as viewed in FIG. 2). This automatically moves the profiled portion 16 into motion transmitting engagement with the profiled portion 17 so that the output member 5 is compelled to share the angular movement of the input member 4 in the direction of arrow 31. In other words, the members 4 and 5 pivot as a unit (in synchronism) as soon as the coupling pawl 12 becomes effective as a result of its disengagement from the stop 14 and under the action of the torsion spring 18. The output member 5 moves its lobes 5a against the non-rotating outer race 9c of the bearing 9 and shifts the entire bearing in the direction of the arrow 33 so that the flange 9b of the sleeve-like part 9a entrains the prongs 10 and causes the diaphragm spring 10A of the friction clutch 2 to allow for disengagement of the pressure plate 2B from the respective lining 2A' of the clutch disc 2A, i.e., the clutch disc 2A ceases to receive torque from the engine and it ceases to transmit torque to the input element 11 of the change-speed transmission.

The brake 20 is engaged when the lobes 4a of the input member 4 reduce the respective clearances 30 to zero, i.e., when they engage the respective bolts 27b and cause the pressure plate 27 to move the disc-shaped member 21 of the brake into requisite frictional engagement with the stationary pressure plate 25 on the housing 3. The width of the clearances 30 is selected in such a way that the clutch 2 is fully disengaged or is disengaged to an extent sufficing to allow for immediate deceleration and normally for full stoppage of the input element 11 before the brake 20 is activated by the lobes 4a. This is determined by the angular positions of the members 4, 5 relative to one another when the pawl 12 couples the input member with the output member, i.e., when these members pivot as a unit to first disengage the clutch 2 via output member 5 and bearing 9 and to thereupon engage the brake 20 via input member 4.

Shifting of the axially movable pressure plate 27 of the brake 20 in a direction toward the fixedly mounted pressure plate 25 takes place when the width of the clearances 30 is reduced to zero and the lobes 4a of the input member 4 continue to move in a direction to the right, as viewed in FIG. 2. The shifting into a different gear can take place as soon as the braking action of the brake 20 is completed or is sufficiently pronounced to effect an optimum deceleration of the input element 11 of the change-speed transmission.

In order to reengage the clutch 2, the pressure upon the clutch pedal 108 is gradually relaxed so that the members 4 and 5 are free to move in a second direction (as indicated in FIG. 2 by the arrow 34). This enables the prongs 10 of the diaphragm spring 10A to push the flange 9b of the sleeve-like part 9a in the direction which is indicated in FIG. 2 by the arrow 35 so that the pressure plate 2B can return into frictional engagement with the respective lining 2A' of the clutch disc 2A. The outer race 9c of the bearing 9 pivots the output member 5 in the direction of arrow 34 and the pawl 12 ensures that such angular movement of the output member 5 is shared by the input member 4.

The brake 20 is disengaged during the first stage of movement of members 4 and 5 in the direction of arrow 34. Such disengagement of the brake 20 is completed not later than when the lobes 4a of the input member 4 move away from the respective bolts 27b (arrow 35 in FIG. 2) to reestablish the respective clearances 30. The extent of movability of the bolts 27b relative to the pressure plate 27 under the action of the dished springs 27c is or can be rather limited. The extent of axial movement of the pressure plate 27 in a direction away from the pressure plate 25 under the action of the coil springs 29 is limited by the heads 28a of the bolts 28 which are affixed to the housing 3. The clutch 2 is engaged (in the aforedescribed manner) after the brake 20 is disengaged so that the clutch disc 2A again receives torque from the engine of the motor vehicle and drives the input element 11 of the change-speed transmission.

The members 4 and 5 of the release system 1 remain coupled to each other until the pawl 12 reengages the stop 14 of the housing 3 and is caused to change its angular position relative to the input member 4 under the action of the springs 15 and 19 but against the opposition of the spring 18. The coil spring 15 overcomes the resistance of the torsion spring 18 so that the input member 4 (which continues to turn in the direction of arrow 34) causes the profiled portion 16 to become disengaged from the profiled portion 17, i.e., the output member 5 is uncoupled from the input member 4 and can automatically compensate for wear, tolerances and analogous parameters before the clutch pedal 108 is depressed again in order to disengage the clutch 2 and to thereafter engage the brake 20. The angular movement of the pawl 12 relative to the input member 4 is preferably gradual (while the input member 4 performs the last stage of its movement back to the starting position of FIG. 2) to avoid unnecessary wear upon and/or other damage to the profiled portions 16 and 17.

Automatic adjustment of the release system 1 is effected as follows: It is assumed that progressing wear upon the linings 2A' of the clutch disc 2A and/or other parts of the clutch 2 enables the prongs 10 of the diaphragm spring 10A to shift the bearing 9 to a different extent in a direction to the left, as viewed in FIG. 2, when the lobes 5a of the output member 5 cease to urge the bearing 9 in the direction of arrow 33. The prongs 10 can also change the angular position of the output member 5 relative to the input member 4 as soon as the pawl 12 ceases to couple these members to each other, i.e., whenever the pressure upon the clutch pedal 108 is relaxed so that the prongs 10 can return the output member 5 to the angular position of FIG. 2. The angular displacement of output member 5 relative to the input member 4 does not affect the extent to which the clutch pedal 108 must be depressed in order to disengage the clutch 2 and to engage the brake 20 because such angular displacement of the output member 5 merely entails an engagement between different teeth or otherwise configurated parts of the profiled portions 16 and 17 when the clutch pedal 108 is depressed again in order to pivot the input member 4 in the direction of arrow 31. In other words, any wearupon the parts of the clutch 2 is compensated for by angular displacement of the output member 5 relative to the input member 4 when the clutch pedal 108 is not depressed so that the pawl 12 does not engage the output member 5, and the profiled portions 16, 17 ensure that such angular displacement of the output member 5 relative to the input member 4 of the release system 1 does not entail a change in the extent to which the clutch pedal 108 must be depressed in order to disengage the clutch 2 and engage the brake 20 for the input element 11 of the change-speed transmission.

The just discussed automatic adjustability of the release system 1 in order to compensate for wear upon the parts of the friction clutch 2 ensures that the brake 20 is always engaged in time, i.e., at a time when the clutch 2 is sufficiently disengaged to offer no resistance, or to offer only negligible resistance, to adequate deceleration or full stoppage of the input element 11.

An important advantage of the improved release system is is reliability, simplicity and low cost. Thus, a portion (lobes 4a) of the input member 4 is utilized to actuate the brake 20 at the most opportune time, namely when the clutch 2 is already disengaged by the lobes 5a of the output member 5. Another important advantage of the improved release system is that it allows for assembly of the brake 20 as an independent unit which is associated with the release system only to the aforementioned extent, i.e., that it is invariably actuated by the input member 4 at a time when the clutch 2 is disengaged. This contributes to simplicity and lower cost of the release system as well as to more convenient access to the brake 20.

Simplicity of the release system is further enhanced by the fact that the members 4 and 5 are arranged to pivot about one and the same axis, and also that the means (shaft 6) which defines such axis is mounted directly in the bell-shaped housing 3 for the clutch 2. As mentioned above, the housing 3 is or can form an integral part of the case for the change-speed transmission whose input element 11 is influenced by the brake 20. The sections 6a, 6b of the shaft 6 can be replaced by much shorter bearing pins or trunnions. The profiled portion 16 of the pawl 12 can be replaced by a single pallet which can enter one of several notches constituting or forming part of the profiled portion 17 of the output member 5. Inversely, the profiled portion 16 of the pawl 12 can comprise several notches or tooth spaces for a pallet constituting the profiled portion of the output member 5. The feature that the stop 14 is located in the path of movement of the pawl 12 to the starting position of FIG. 2 is desirable and advantageous because such construction of the release system ensures that the profiled portion 16 of the pawl 12 is automatically disengaged from the profiled portion 17 of the output member 5 not later than when the input member 4 reassumes its starting position under the action of the spring 15 so that the angular position of the output member 5 relative to the input member 4 can be changed (if necessary in order to compensate for wear) before the clutch pedal 108 is depressed again preparatory to shifting of the change-speed transmission into a different gear. The feature that the torsion spring 19 biases the output member 5 in a direction to ensure that the lobes 5a tend to engage or remain in contact with the non-rotating outer race 9c of the clutch-actuating bearing 9 is desirable and advantageous because this ensures that the disengagement of the clutch 2 (or at least the movement of the bearing 9 in a direction (arrow 33) to disengage the clutch) can begin as soon as the pawl 12 compels the output member 5 to share the angular movement of the input member 4 in the first direction (arrow 31). The aforediscussed relationship between the forces of the springs 15 and 18 ensures that the pawl 12 is disengaged from the output member 5 when the clutch 2 is engaged, i.e., when the input member 4 dwells in the starting position of FIG. 2.

The improved release system is susceptible of many further modifications without departing from the spirit of the invention. For example, the composite shaft 6 can be replaced with a one-piece shaft. Furthermore, the input member 4 can be rotatably mounted on its shaft or shaft section if it is more directly coupled with the clutch pedal, e.g., if it receives motion directly from the link 7 rather than from the shaft section 6a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A release system, particularly a selfadjusting release system for friction clutches of the type having a rotary output element, a brake which is actuatable to decelerate the output element and a component movable to and from a clutch-actuating position, comprising input and output members pivotable in first and second directions; means for pivoting one of said members in said first direction; means for releasably coupling said members for joint movement in said first direction, the other of said members having means for advancing said component to said clutch-actuating position in response to pivoting in said first direction and said one member having means for actuating said brake upon actuation of the clutch by said component through the medium of said other member; and means for moving said members in said second direction.

2. The release system of claim 1, further comprising stop means for limiting the extent of movement of said one member in said second direction under the action of said moving means.

3. The release system of claim 2, wherein said stop means is located in the path of movement of said coupling means with said members in said second direction under the action of said moving means and is arranged to separate said coupling means from one of said members.

4. The release system of claim 1 for friction clutches of the type having a housing, further comprising shaft means mounted in said housing and defining a pivot axis for each of said members.

5. The release system of claim, 4, wherein said shaft means comprises a common shaft for said members.

6. The release system of claim 1, wherein the clutch-actuating component is an antifriction bearing and said pivoting means comprises a clutch pedal.

7. The release system of claim 6, wherein said one member is said input member.

8. The release system of claim 1, further comprising means for securing said coupling means to said input member.

9. The release system of claim 8, further comprising stop means located in the path of movement of said coupling means with said members in said second direction under the action of said moving means to thereby disengage said coupling means from said output member.

10. The release system of claim 8, wherein said coupling means comprises a pawl and said securing means comprises a pivot provided on said input member and angularly movably supporting said pawl.

11. The release system of claim 10, wherein said pawl includes a first profiled portion and said output member comprises a second profiled portion complementary to and engaged by said first profiled portion in response to movement of said input member in said first direction to thereby entrain said output member in said first direction.

12. The release system of claim 11, further comprising resilient means for yieldably biasing said first profiled portion against said second profiled portion.

13. The release system of claim 1, further comprising resilient means interposed between said members and arranged to yieldably bias such members in opposite directions.

14. The release system of claim 13, wherein said resilient means comprises a spring arranged to urge said output member in said first direction.

15. The release system of claim 1, further comprising stop means, said moving means comprising means for yieldably biasing said, one member toward said stop means.

16. The release system of claim 15, wherein said coupling means is movably mounted on said one member and is movable into engagement with said other member in response to movement of said one member in said first direction, said stop means being located in the path of movement of said coupling means with said one member and said second direction and further comprising resilient means for urging said coupling means toward engagement with said other member with a force which is weaker than the force of said biasing means so that said coupling means is disengaged from said other member when it abuts against said stop means and said one member continues to move in said second direction under the action of said biasing means.

17. The release system of claim 1, wherein said pivoting means comprises a shaft which is rigid with said one member, a housing rotatably supporting said shaft, and a clutch pedal arranged to change the angular position of said one member through the medium of said shaft.

18. The release system of claim 1, wherein the brake comprises a disc axially movably mounted on and rotatable with the output element, a stationary pressure plate at one side of said disc and a movable pressure plate at the other side of said disc, said one member being arranged to move said disc against the stationary pressure plate through the medium of the movable pressure plate.

19. The release system of claim 18, wherein the brake further comprises means for yieldably biasing said movable pressure plate away from said disc.

20. The release system of claim 1, wherein said members are pivotable about an axis which is normal to the axis of the output element.

* * * * *

UNITED STATES PATENT AND TRADEMARK OFFICE
CERTIFICATE OF CORRECTION

PATENT NO. : 4,572,341
DATED : February 25, 1986
INVENTOR(S) : Paul MAUCHER

It is certified that error appears in the above-identified patent and that said Letters Patent are hereby corrected as shown below:

Title page:

[30] Foreign Application Priority Data should include a second priority application:
May 28, 1983 [DE] Fed. Rep. of Germany ..... 3347832.
Col. 11, line 30, second "is" should read --its--.
Col. 14, line 3, after said delete ",".

Signed and Sealed this

Twenty-sixth Day of August 1986

[SEAL]

Attest:

DONALD J. QUIGG

Attesting Officer

Commissioner of Patents and Trademarks